US012055918B2

(12) United States Patent
Bond

(10) Patent No.: US 12,055,918 B2
(45) Date of Patent: Aug. 6, 2024

(54) SYSTEM AND METHOD FOR AUTOMATED PRECISION CONTROL OF A COMPUTER NUMERICAL CONTROL (CNC) MACHINE

(71) Applicant: Brett Bond, Summit, NJ (US)

(72) Inventor: Brett Bond, Summit, NJ (US)

( * ) Notice: Subject to any disclaimer, the term of this patent is extended or adjusted under 35 U.S.C. 154(b) by 12 days.

(21) Appl. No.: 18/143,435

(22) Filed: May 4, 2023

(65) Prior Publication Data
US 2023/0418261 A1 Dec. 28, 2023

Related U.S. Application Data

(63) Continuation of application No. 18/083,638, filed on Dec. 19, 2022, now Pat. No. 11,703,828, which is a continuation of application No. 17/846,184, filed on Jun. 22, 2022, now Pat. No. 11,609,550.

(51) Int. Cl.
*G05B 19/414* (2006.01)
*G05B 19/25* (2006.01)

(52) U.S. Cl.
CPC ....... *G05B 19/4145* (2013.01); *G05B 19/253* (2013.01)

(58) Field of Classification Search
None
See application file for complete search history.

(56) References Cited

U.S. PATENT DOCUMENTS

2021/0252733 A1* 8/2021 Kübeler ................ B27G 19/04

* cited by examiner

*Primary Examiner* — Ryan A Jarrett
(74) *Attorney, Agent, or Firm* — Michael J. Feigin, Esq.; Feigin and Fridman LLC

(57) ABSTRACT

A system, method, and device for automated precision control of a computer numerical control (CNC) machine to a workpiece. The system receives via at least one visual input device at least one detectable marking on a workpiece. The system decodes the at least one detectable marking and determines a stored and pre-defined movement routine of a cutting element attached to the CNC machine relative to the workpiece based on the at least one marking. The system then determines, using the at least one visual input device and/or another visual input device, a current position of a working end of the cutting element relative to the at least one marking. Finally, the system performs the pre-defined movement routine including cutting into the workpiece with the cutting element.

15 Claims, 13 Drawing Sheets

SYSTEM AND METHOD FOR AUTOMATED PRECISION CONTROL OF A COMPUTER NUMERICAL CONTROL (CNC) MACHINE

FIELD OF THE DISCLOSED TECHNOLOGY

The disclosed technology relates generally to methods of creating a precise workpiece, and, more specifically, to a method and a system for automated precision control of a computer numerical control (CNC) machine to create a precise workpiece, using visual indicia.

BACKGROUND OF THE DISCLOSED TECHNOLOGY

Computer numerical control (CNC) machines are precision machines capable of accurately manipulating (e.g. cutting, bending, etching, 3d printing) a workpiece, based on specifications and parameters provided to a machine via a computer.

In the prior art, in order to achieve accurate, repeatable CNC-machined parts that comply with design tolerances, it is commonly necessary to specify a large number of parameters for each machining operation, typically using Computer Aided Manufacturing (CAM) software. These parameters may include the material's physical position relative to a work coordinate system offset defined in the machine's control software, such as "G54," the default work coordinate offset commonly used in G-Code-based systems. The complete set of required parameters supplied to the CAM software, can then be used to generate CNC machine control commands, for example G-Code.

At the CNC machine, the machinist positions and fixes the material to the worktable and sets the coordinates, telling the CNC machine where to start a cut. The position of the material on the worktable, if needed, is then compensated for in the CNC controller's software, such as by modifying the coordinates of the work offset. In practice, alignment and fixturing of the workpiece often involves several time-consuming corrective steps, particularly for novice CNC machinists. Often, modifications to the CAD model, the CAM toolpath, the output G-Code, the CNC controller work offsets, the material itself, and possibly all of the above, are made before activating the machine to produce an in-tolerance part.

In addition to workpiece positional parameters and their adjustment, many other parameters must often be modified and refined to obtain acceptable CNC performance. Adjustment of such parameters requires skilled operator time, often consume extra material for test passes, can result in damage to parts, damage to tools, and occasionally damage to the CNC equipment itself.

Furthermore, machining large pieces of material can generate additional complexity. For example, a linear piece of material may be placed on a diagonal of the worktable rather than aligned to the worktable's X or Y axes. Such cases require adjustment of machining parameters in CAD, CAM or even the CNC control software to allow for diagonal material cutting. These require significant operator skill in measurement and material placement, such as carefully measuring with an angle measurement tool, and skillfully aligning then fixturing the part to produce in-tolerance results. This precise material positioning requires additional skill and time, can often lead to mistakes, and/or wasted material both from requiring multiple test runs, and from performing machining operations such as drills, slots or cuts on a larger piece of material stock to account for reduced predictability of the cut path.

It is common practice among carpenters and various material workers to mark indicia on a material to be cut or worked. Simple material marks, such as scoring material with tools such as scribes, punches or even just pen marking, make it possible to accurately measure and mark important positions relative to previously-faced and squared precision edges, corners and surfaces, either provided by the stock material or from a prior machining operation. For instance, to define the point where a hole is to be drilled, a machinist may typically measure with a ruler, caliper or micrometer, scribe a line parallel to a precisely machined material edge, then measure and punch a hole location along the marked line. This small indication on the material can provide a starting point for a drilling or milling operation both by its visual location and as a physical indentation to guide the drill. Prior to the advent of CNC tooling, and even to the present day this is common practice.

Indicia such as dots, crosses (exes), or lines drawn on material, on paper or on computer drawings may be used to define a set of indication primitives intended to guide the machinist on how to fabricate a part within the allowable deviations of the designer. Informally, any indicia that allows a machinist to repeatably produce in-tolerance results are acceptable. More formally, a symbolic language known as Geometric Dimensioning and Tolerancing (GD&T), as defined under several international standards such as ASME Y14.5 or ISO Geometrical Product Specifications consists of a rich set of visual indicia. Such indication primitives are commonly used in modern CAD software as the basis for sketching dimensioned drawings, which can be built upon to create 3-dimensional models. As is commonplace in manual operations, indications on a material workpiece can provide tightly-toleranced and detailed engineering specifications directly on the material prior to performing a variety of machining operations using manual machines such as manual mills, lathes, drill presses, saws, sheet metal tools such as brakes and sheers, and other common machine shop equipment.

Furthermore, those same indication primitives have been used and improved by carpenters, metal workers and builders for centuries. As metrology and marking tools and techniques advance, so too has precision increased in machining operations. For precision machining these markings are typically called out relative to a starting reference surface, commonly a finely ground flat stone such as a surface plate from which all other measurements are taken.

The centuries-old process of measuring from a reference surface, then marking, and cutting has languished in the modern CNC workshop. The skillset specialization required has created a rift between the industrial designer, mechanical engineer, CNC part programmer and CNC machine operator, though it is widely acknowledged that rapid part iteration allows engineers and machinists alike to experiment and improve designs, adjusting dimensions and refining parts as needed. A rapid and easy process to work in this iterative methodology has been hampered due to the complexity of the software and of operating CNC equipment. CNC machines are more capable than ever, but are also more time consuming, costly, difficult and often frustrating to use, so much so that skilled machinists can often manually machine a wide range of parts in less time and more efficiently than working with CNC machines.

Despite the increasingly wide availability of CNC machinery, in both amateur and professional workshops a wide range of electrical, pneumatic and hydraulic or otherwise powered tooling may be found in use today. Many of these tools duplicate functionality that can be performed by a single CNC machine. As such, the complexity of use of CNC machines results in duplication of workshop functionality, having a high price-tag.

To focus on a single operation such as drilling, a drill press, a milling machine and a lathe may all be employed in the drilling or boring of holes in wide range of materials. These manual machines are often preferred for simple boring operations whereby the machinist measures and marks their material, fixes it in the machine and performs the operation on the spot. Equivalent operations could be performed on a CNC mill, router, plasma cutter, punch or laser, but would typically first require modeling the material and the hole positions, then using CAM software to generate the appropriate tool paths, entering material heights including material base, retract height, and clearance height, selecting the tool to bore the holes, defining the material location on the machine, creating a CNC setup, setting feeds and speeds, outputting G-Code, then at the machine reading the G-Code into the CNC control software, fixturing the material precisely to match the coordinate axes specified in CAM, navigating the CNC tool head to a corner of the material, zeroing the work coordinates on that position, performing an "air cut" wherein the tool path is executed by the CNC machine above the workpiece to confirm it does not collide with anything, and finally executing the G-Code and monitoring the machine as it performs the drilling operations.

For simple operations such as drilling a few holes, it is impractical or inefficient to use CNC equipment unless the same or similar operations are frequently repeated.

As mentioned, the set of parameters that frequently require skillful adjustment are large and complex, and relate to many aspects of the material, the worktable, the planned machining process, and the machining tool. CAM software available on the market such as Vectric's Aspire, Inventable's Easel, and others, offer reduction in number of input parameters by providing templates, defaults, packaged tool paths, and other simplifications. However, since these software products have no awareness of workpiece position in the physical world, some of the most tedious and difficult parts of CNC machine operation remain. The further simplification of CAD and CAM tools, often causes the operator to have less control over relevant parameters.

At the other end of the complexity and cost spectrum, high-end CAM software such as Hexagon's Esprit offers detailed physical simulation of the operating characteristics of thousands of particular makes and models of CNC machinery, so toolpaths can be planned by a CNC programmer at a desk rather than an operator at the machine. Some CAM software packages such as Mazak's Smooth AI Spindle offer real-time measurement and compensation during cutting operations such as chatter control whereby speeds and/or feed rates are adjusted in real-time if chatter is detected. These are welcome advances in the part fabrication industry, however none of these remedy the core dilemma of locating material and cut locations.

There is thus a need in the art for a method and a system simplifying the setup and calibration of CNC machines, particularly with respect to the location of the material relative to the workspace and tooling, in order to quickly produce high-precision parts.

SUMMARY OF THE DISCLOSED TECHNOLOGY

The disclosed technology provides a method and a system for automated precision control of a computer numerical control (CNC) machine to create a precise workpiece, using visual indicia.

There is provided, in accordance with an embodiment of the disclosed technology, a system for automated precision control of a computer numerical control (CNC) machine to a workpiece. The system receives via at least one visual input device at least one detectable marking on a workpiece. The system decodes the at least one detectable marking and determines a stored and pre-defined movement routine of a cutting element attached to the CNC machine relative to the workpiece based on the at least one marking. The system then determines, using the at least one visual input device and/or another visual input device, a current position of a working end of the cutting element relative to the at least one marking. Finally, the system performs the pre-defined movement routine including cutting into the workpiece with the cutting element.

In some embodiments, the at least one visual input device and a holder for the cutting element are fixedly mounted to, and move together, relative to a position of the workpiece.

In some embodiments, the cutting element holder is adapted to removably hold the cutting element and the mount for the workpiece is adapted to removably hold the workpiece.

In some embodiments, the at least one visual input device includes a plurality of visual input devices which are used to determine at least a two-dimensional location in a three-dimensional space of the workpiece.

In some embodiments, the at least one visual input device is used to determine a scale of the pre-defined movement routine and to apply a magnification level of the pre-defined movement routine to the workpiece.

In some embodiments, the at least one marking is handwritten and determined, in the step of decoding, to be a square, and a starting position of the cutting is at the center of the square. In some embodiments, in the step of decoding, decoding a marking of two lines is insufficient to cause the step of performing to be carried out until the two lines are inscribed within a larger proximate shape.

In some embodiments, the pre-defined movement routine is parameterized by one or more variables, and the at least one marking includes a marking representative of a constant value used in place of each of the one or more variables when performing the pre-defined movement routine.

In some embodiments, the at least one marking includes a first marking and a second marking. The first marking corresponds to a first reference point of the pre-defined movement routine, and the second marking corresponds to a second reference point on the workpiece cut during the pre-defined movement routine. In some embodiments, the pre-defined movement routine is at least one of translated, rotated and scaled based on a position of the second marking compared to a position of the first marking.

There is provided, in accordance with an embodiment of the disclosed technology, a method of modifying a workpiece including steps of securing the workpiece to a fixed location, and marking a surface of the workpiece with human readable indicia using a handheld writing apparatus (or paper cutout with indicia) placing markings at a specific location on the workpiece causing a cutting tool to move in at least three axes to a coordinate of the marking. The human readable indicia is associated with a predefined series of movements which begin relative to a position of a detected marking on a surface.

In some embodiments, the human readable indicia include a first indicium at a first coordinate on the workpiece and a second indicium at a second coordinate on the workpiece and the predefined series of movements is at least one of translated, rotated and scaled based on positions of the first indicium and the second indicium such that the cutting tool cuts relative to the first indicium and the second indicium.

In some embodiments, the human readable indicia include at least one indicium indicating a location to be cut by the cutting tool, one indicium associated with, and causing, a selection of one of the pre-defined series of movements, and one indicium indicating a variation to the predefined series of movements. In some embodiments, the one indicium indicating of a variation includes a real number and the variation includes carrying out a trigonometric modifying function on the predefined series of movements before the cutting tool cuts.

In some embodiments, the pre-defined series of movements includes a graphic which, when the cutting tool cuts, is at an orientation relative to placement of the first indicium and the second indicium.

There is provided, in accordance with another embodiment of the disclosed technology, a device including a computer numerical control (CNC) machine with a movable housing having a cutting element therein, and a spatial recognition system further including at least one visual input device mounted to the movable housing. The device further includes a control mechanism with an input from the spatial recognition system and an output which controls placement of the movable housing. Based on the input from the spatial recognition system, upon the control mechanism detecting printed indicia on a surface of a workpiece, the movable housing is moved into position such that rotation of the bit cuts into the printed indicia and the workpiece.

"Substantially" and "substantially shown," for purposes of this specification, are defined as "at least 90%," or as otherwise indicated. "Identical" or "exactly," for purposes of this specification, is defined as "within an acceptable tolerance level known in the art." Any device may "comprise," or "consist of," the devices mentioned there-in, as limited by the claims. Any element described may be one of "exactly" or "substantially," as described.

For the purposes of the present application, "control of a CNC machine" is considered to include navigation of a working tool, operation of the working tool, and activating or deactivating an electric motor, a coolant supply or pump, a vacuum device, and the like.

For the purposes of the present application, the terms "marking" or "markings" and "indicium" or "indicia" are used interchangeably, and are defined as one or more symbols formed on a workpiece or on a worktable, which are observable by a visual input device. The symbols may be made in any suitable way, such as using ink, tape, stickers, localized etching, and the like.

It should be understood that the use of "and/or" is defined inclusively, such that the term "a and/or b" should be read to include the sets: "a and b," "a or b," "a," or "b."

DETAILED DESCRIPTION OF EMBODIMENTS OF THE DISCLOSED TECHNOLOGY

A system for automated precision control of a computer numerical control (CNC) machine operating on a workpiece includes receiving, via at least one visual input device, at least one detectable marking on a workpiece. The at least one detectable marking would typically have been placed on the workpiece by an operator of the system, or of the machine. The at least one detectable marking is decoded to determine a stored and pre-defined movement routine of a cutting element attached to said CNC machine relative to said workpiece based on the at least one marking. Using the one or more visual input devices and/or other visual input devices, a current position of a working end of said cutting element relative to the at least one marking is determined. Subsequently, the pre-defined movement routine, which includes cutting into the workpiece with the cutting element, is performed.

A method of modifying a workpiece includes the steps of securing the workpiece to a fixed location, and marking a surface of said workpiece with human readable indicia using a handheld writing apparatus, to cause a cutting tool to move in at least three axes to a coordinate of the marking. The human readable indicia is associated with a predefined series of movements which begin at a position of a detected marking on a surface. As an example, a marking might be "Bore(A, diam=2.0, d=0.25)" which instructs the cutting of a circle that is 2" in diameter and 0.25" deep.

A device includes a computer numerical control (CNC) machine with a movable housing having a cutting element therein. The device further includes a spatial recognition system, which includes at least one visual input device mounted to the movable housing. The device also includes control mechanism receives input from said spatial recognition system and provides output which controls placement of said movable housing. Based on the input from the spatial recognition system, upon the control mechanism detecting printed indicia on a surface of a workpiece, the control mechanism causes motion of the movable housing into position such that rotation of the cutting element cuts into the printed indicia and said workpiece. The spacial recognition system can include depth sensors, time-of-flight determinations, stereo camera, and two-dimensional cameras.

Embodiments of the disclosed technology will become clearer in view of the forthcoming description of the figures.

Figure 1A:
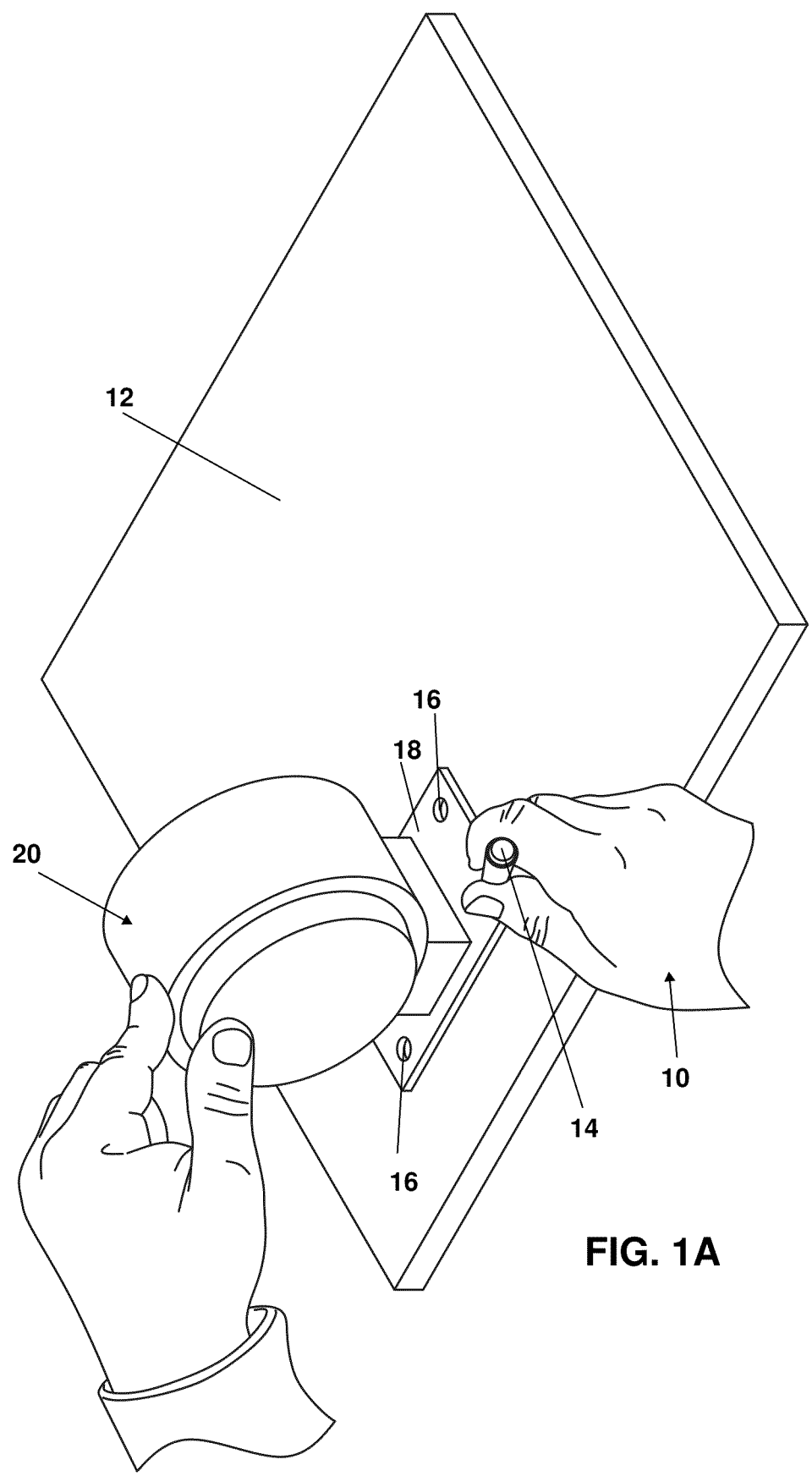
FIGS. 1A and 1B show marking steps of a method for modifying a workpiece using a CNC machine according to an embodiment of the disclosed technology.
Figure 1B:
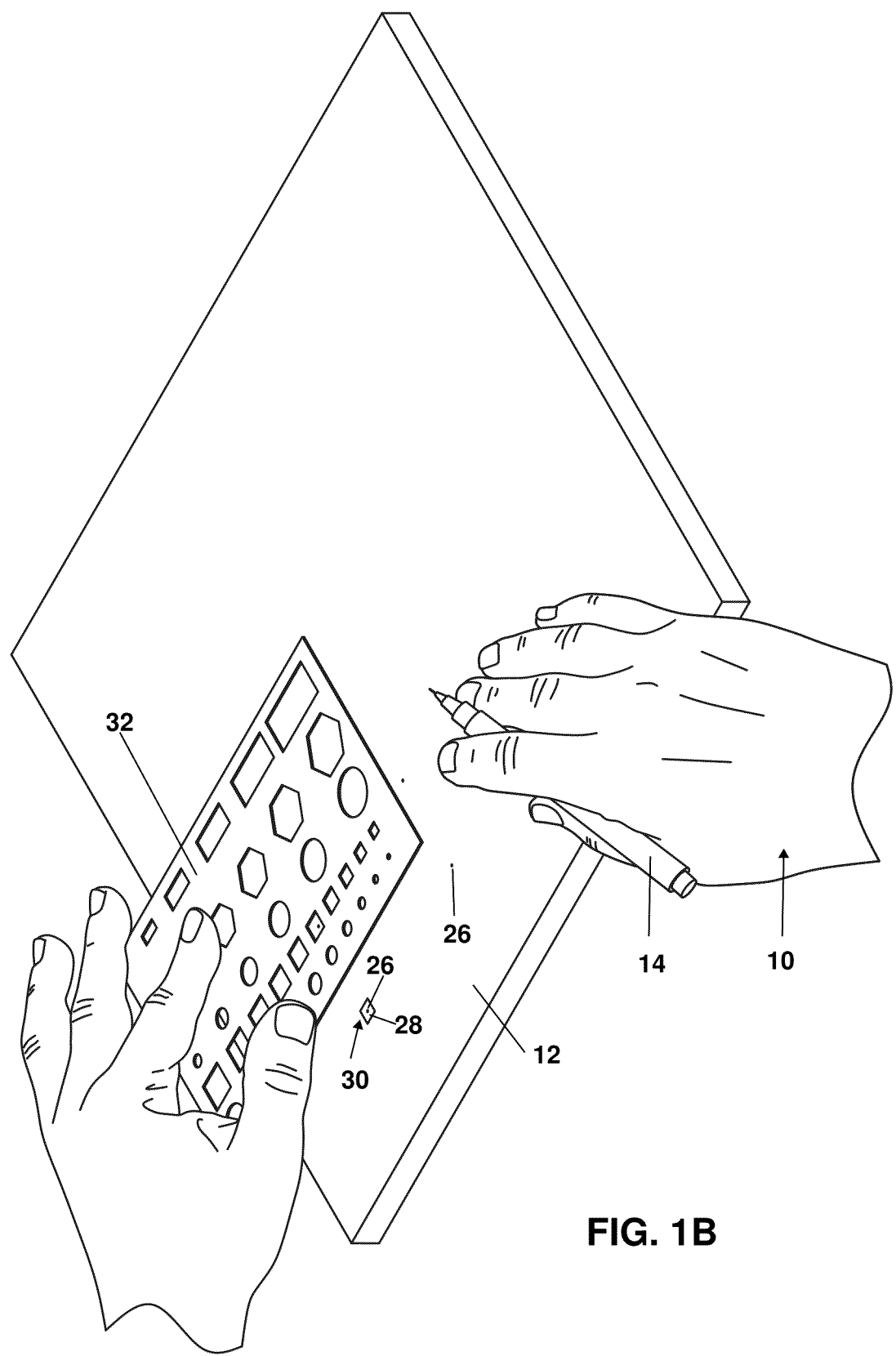

FIGS. 1A and 1B show marking steps of a method for modifying a workpiece using a CNC machine according to an embodiment of the disclosed technology. As seen in FIG. 1A, a user 10 manually marks a workpiece 12, using a writing implement 14, such as a pen or pencil, with locations 16 to be modified by the CNC machine, such as locations to be cut.

In the illustrated embodiment, the user marks four locations 16, corresponding to bores in a base 18 of a device 20 that the user wishes to mount onto workpiece 12. However, any suitable number of markings, for any purpose, may be marked by the user at this step.

Turning to FIG. 1B, it is seen that the user initially marked workpiece 12 with dots 26, representing the four locations 16. Subsequently, user 10 uses writing implement 14 to expand the marking including the dot 26. In the illustrated embodiment, the user draws a square 28 around each dot 26, such that the dot is at the center of the square, to form a marking 30. However, in other embodiments, different markings may be used, such as an x shape having the dot at its center, a cross having the dot at its center, a circumscribing circle, and the like. In some embodiments, the user may use a stencil 32 to ensure that all the markings are equally sized, consistent, and/or accurate.

Reference is now made to FIGS. 2A, 2B, 2C, 2D, 2E, 2F, and 2G, which illustrate scanning steps of a method for modifying a workpiece using a CNC machine according to an embodiment of the disclosed technology. The scanning steps are used for identifying and/or calibrating positional parameters of a CNC machine, relative to workpiece 12, using markings 30 applied in the marking steps of FIGS. 1A and 1B.

Figure 2A:
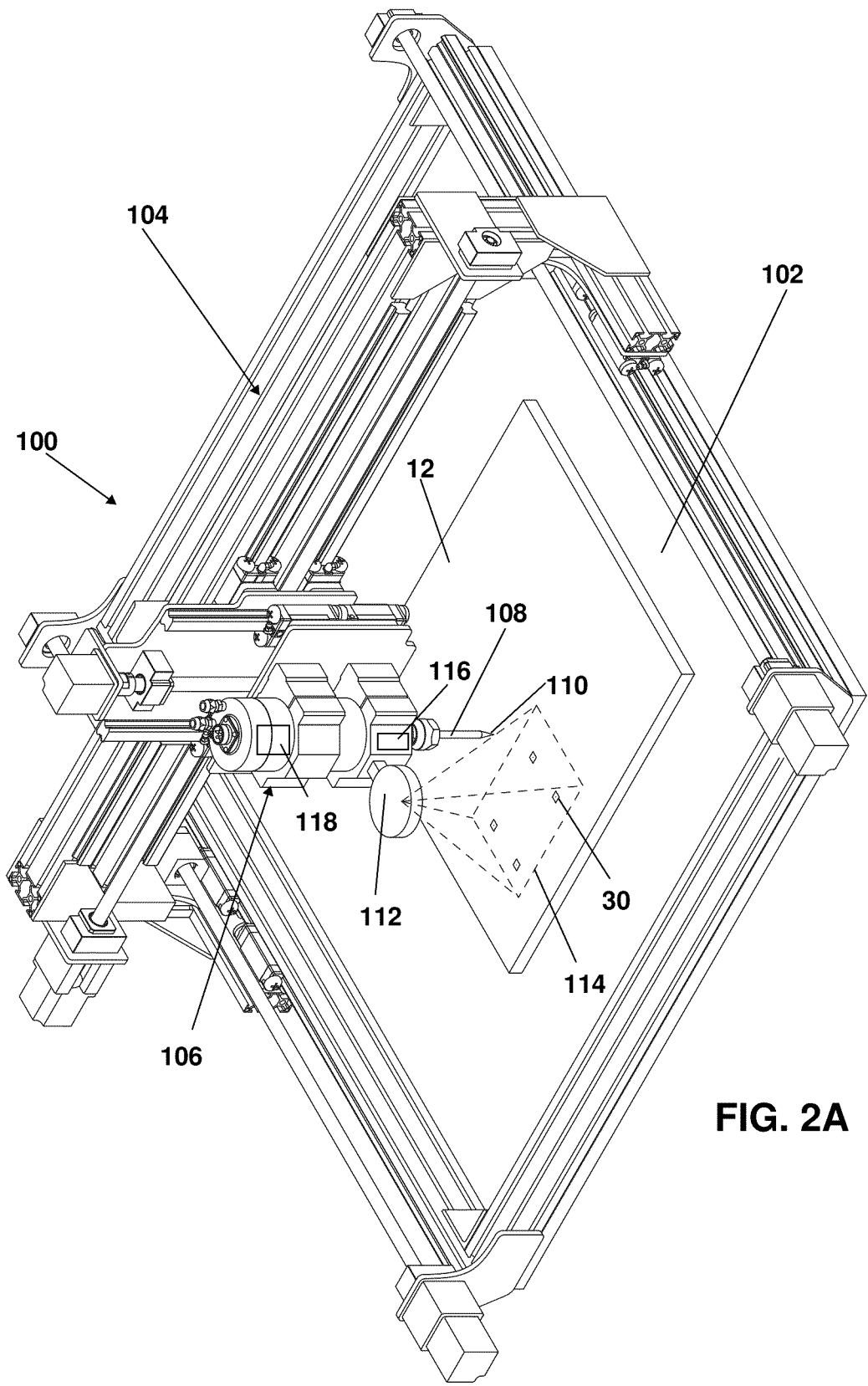
FIGS. 2A, 2B, 2C, 2D, 2E, 2F, and 2G illustrate scanning steps of a method for modifying a workpiece using a CNC machine according to an embodiment of the disclosed technology.

As seen in FIG. 2A, a CNC machine 100 includes a base surface 102, onto which is placed a workpiece, such as workpiece 12. A mobilizing assembly 104 is adapted to mobilize a movable housing, or working head, 106 in at least three dimensions relative to base surface 102 and to workpiece 12. In some embodiments, mobilizing assembly 104 is adapted to mobilize working head 106 along more than 3 degrees of freedom or axes, 365 such, such as along six degrees of freedom or axes. Working head 106 includes a working element 108 terminating in a working end 110. One or more visual input devices 112, are disposed on working head 106, to capture an image of a field of view 114, the field of view including a position of working end 110. Device(s) 112 are adapted to move together with the working element 108.

In the illustrated embodiment, the working element 108 comprises a cutting element, such as a cutting bit, terminating in a cutting end. However, in some embodiments, the working element may be any suitable working element, such as a router, a mill, a lathe, a laser, a water jet, a three-dimensional printing element (e.g. a material depositing element used for three-dimensional printing), a vinyl cutter, and a wire bender.

Visual input device(s) 112 may include any suitable type of device. For example, a device 112 may be a depth sensor, a camera, a stereo camera, or a depth finder using time of flight to determine depth. Device(s) 112 being able to identify depth may be particularly advantageous in determining a starting Z-value for working end 110 of the working element, relative to workpiece 12. Device(s) 112 being able to identify depth may also be advantageous in providing compensation during a cutting routine cutting into workpiece 12, for example for projecting cutting tool paths onto the surface of a workpiece having variable heights. Such identification of depth can also be used for purposes of collision avoidance with items or the surface of the workpiece.

Visual input device(s) 112 is functionally associated with a spatial recognition system 116, which provides input to a controller 118 forming part of the CNC machine. Specifically, device(s) 112 may be one or more cameras, which capture an image of the field of view 114, and provide the image to controller 118. Controller 118 is adapted to receive the input from spatial recognition system, and to detect a two-dimensional location of printed markings in the image, such as detecting markings 30 within the field of view 114. Controller 118 is then adapted to move the working head into a suitable place, such that when the working head is operated, the operation is at the detected markings. As shown and described hereinbelow, the operation maybe cutting into workpiece 12, at the location of markings 30.

Figure 2B:
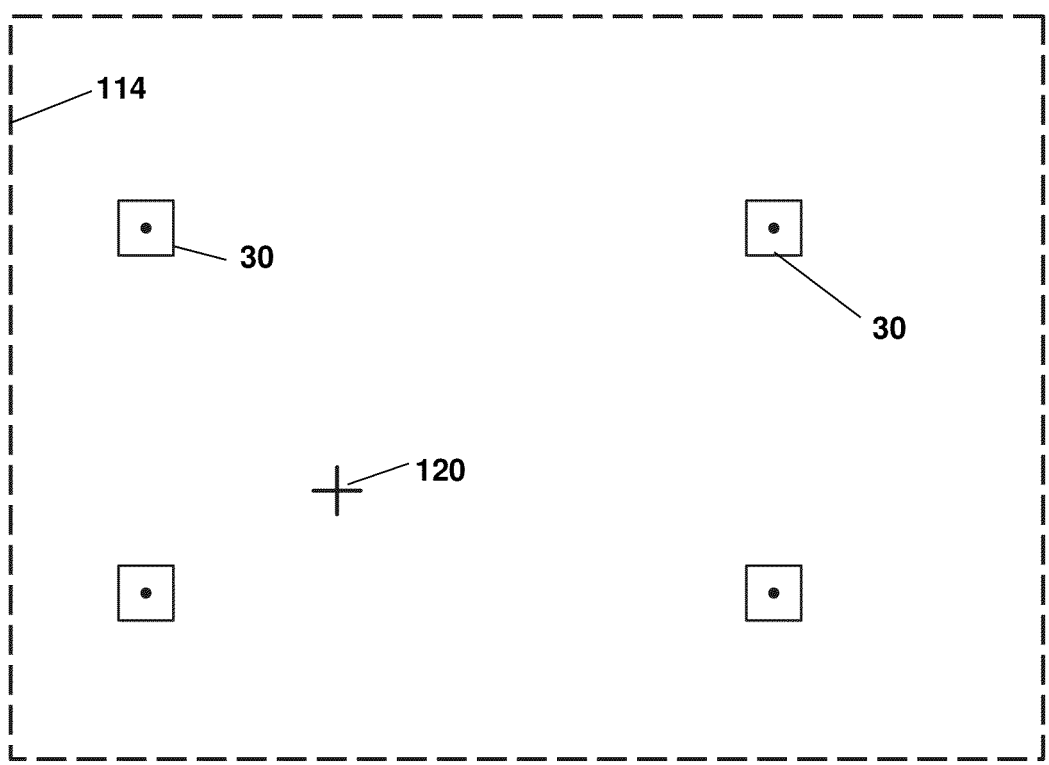
Figure 2C:
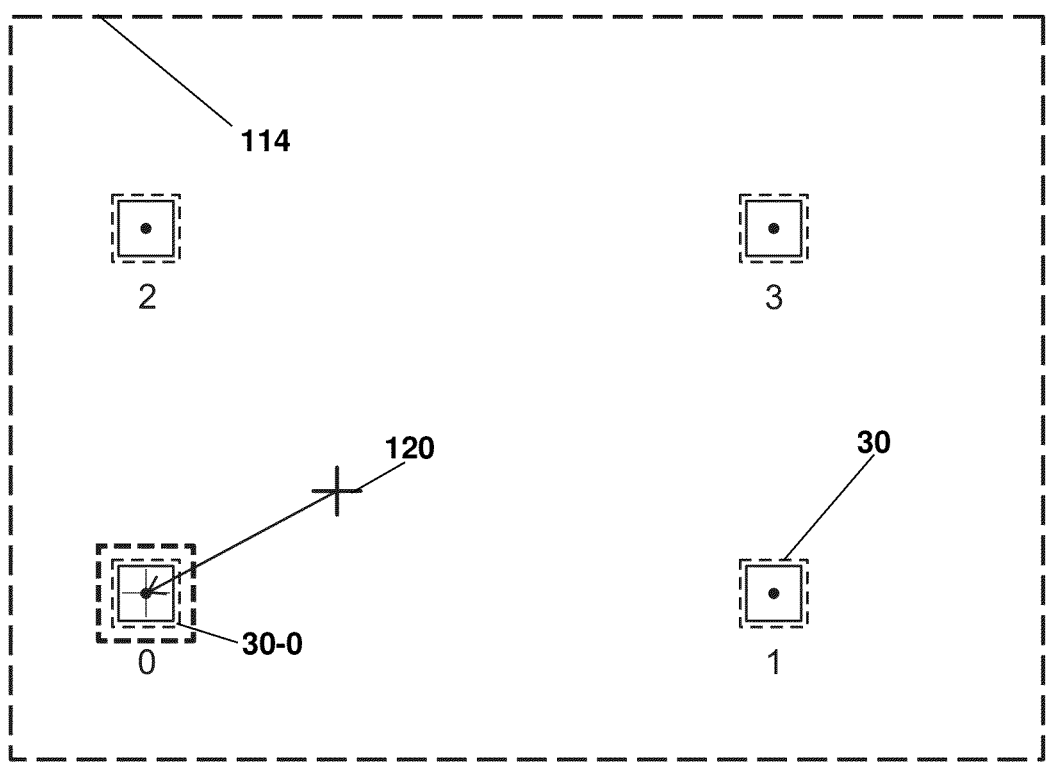

FIGS. 2B to 2G show the steps of CNC machine 100 scanning markings 30 within field of view 114. In FIG. 2B, a marker 120 indicates a location detected by controller 118, within the image of field of view 114 captured by camera 112. In FIG. 2B, marker 120 is disposed at some location within the field of view. In FIG. 2C, controller 118 identifies a first of markings 30-0 at position 0, and begins moving marker 120 to align with marking 30-0.

Figure 2D:
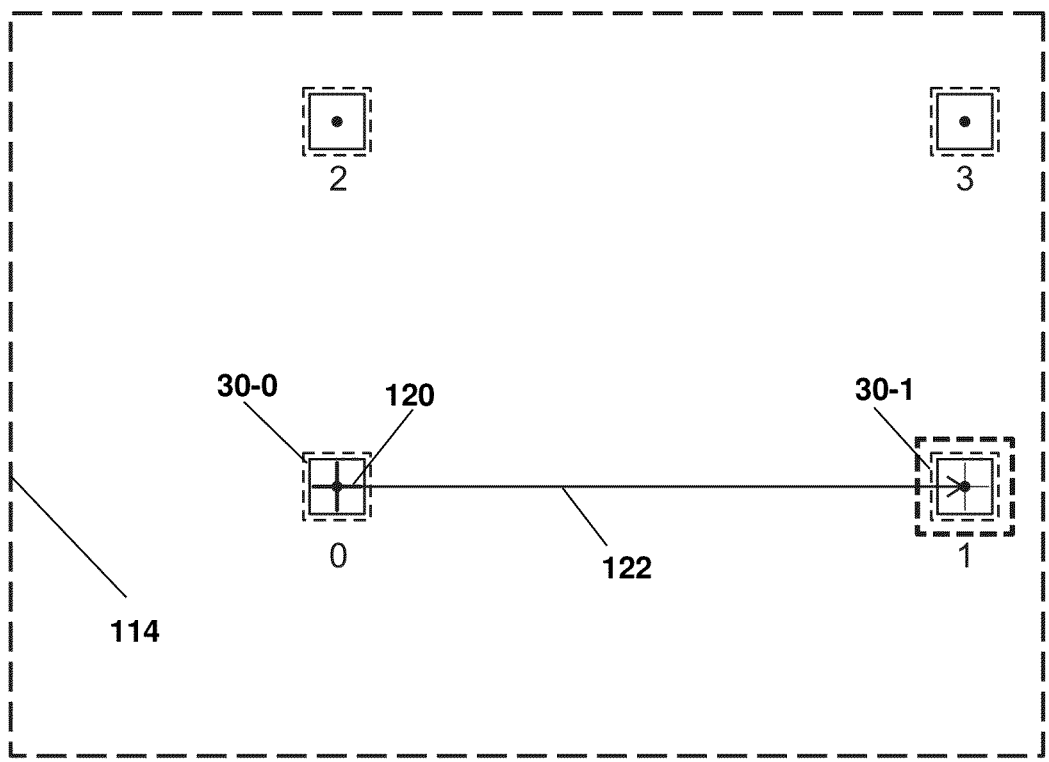

In FIG. 2D, controller 118 identifies a second of the markings 30-1, at position 1, and identifies that the marking 30-1 is located at a straight line 122 from marking 30-0. Controller 118 moves marker 120 to align with marking 30-1.

Figure 2E:
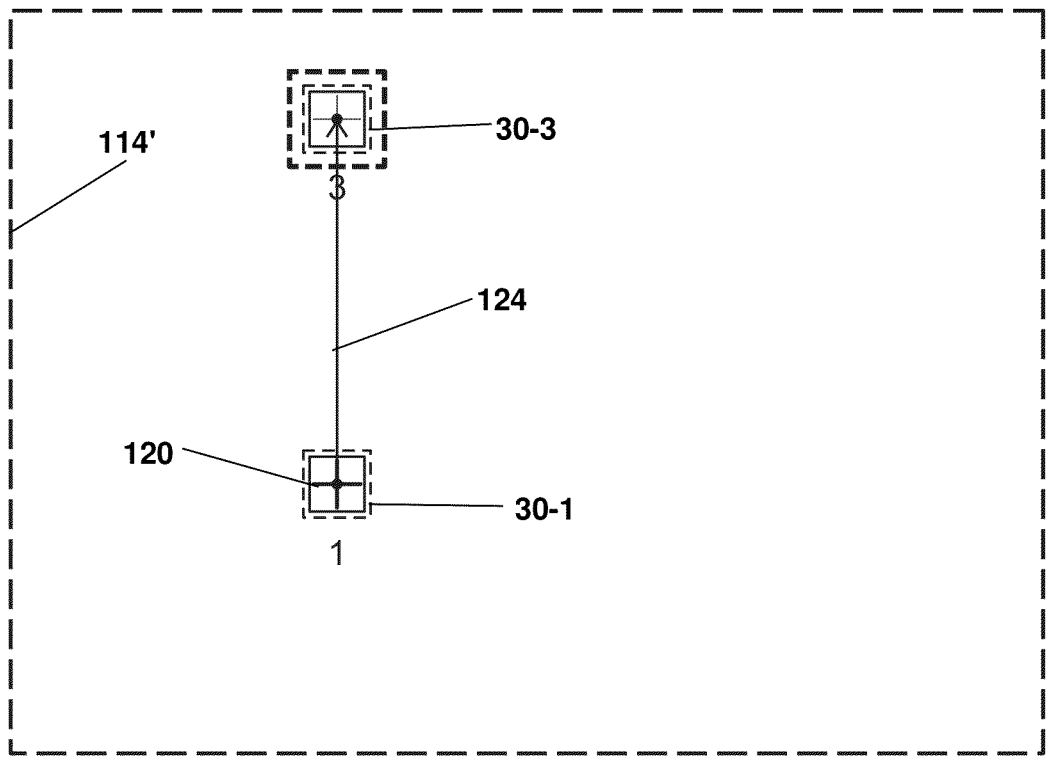

As seen in FIG. 2E, motion of marking 120 to align with marking 30-1 also moves the field of view, such that field of view 114' includes markings 30-1 and 30-3, but does not include marking 30-0 (FIG. 2D). In FIG. 2E, controller 118 identifies a third of the markings 30-3, at position 3, and identifies that the marking 30-3 is located at a straight line 124 from marking 30-1. Controller 118 moves marker 120 to align with marking 30-3.

Figure 2F:
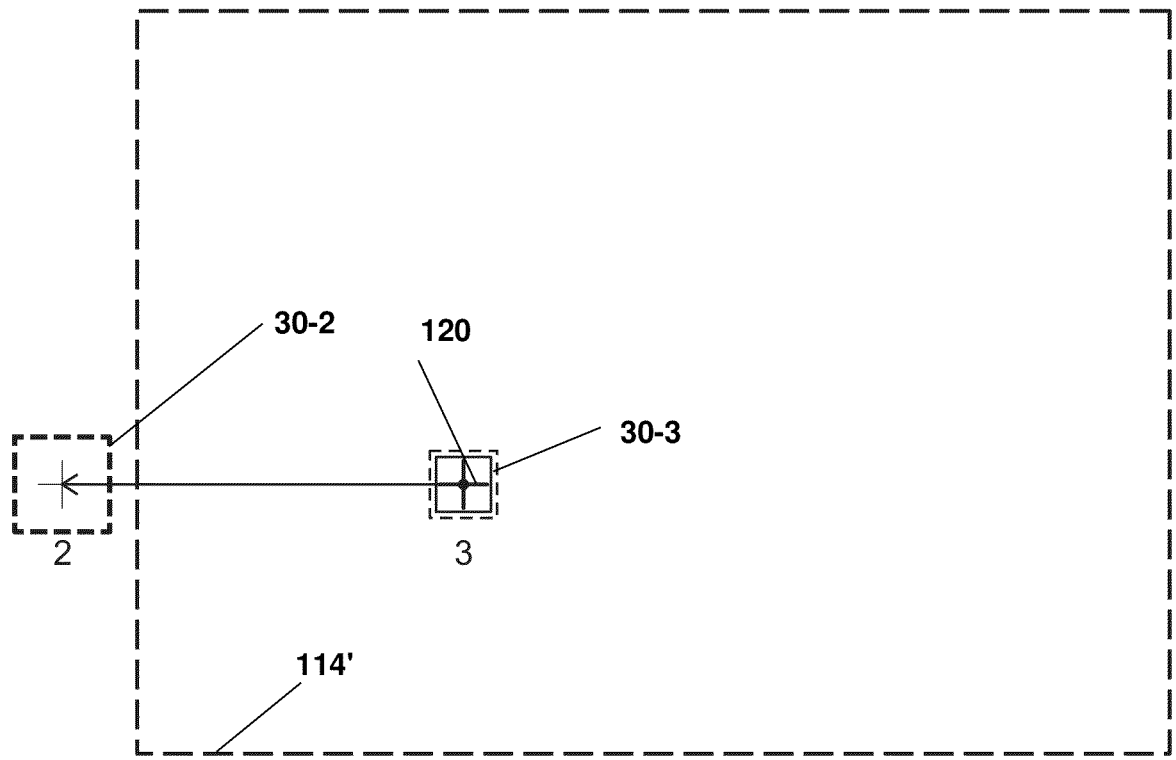
Figure 2G:
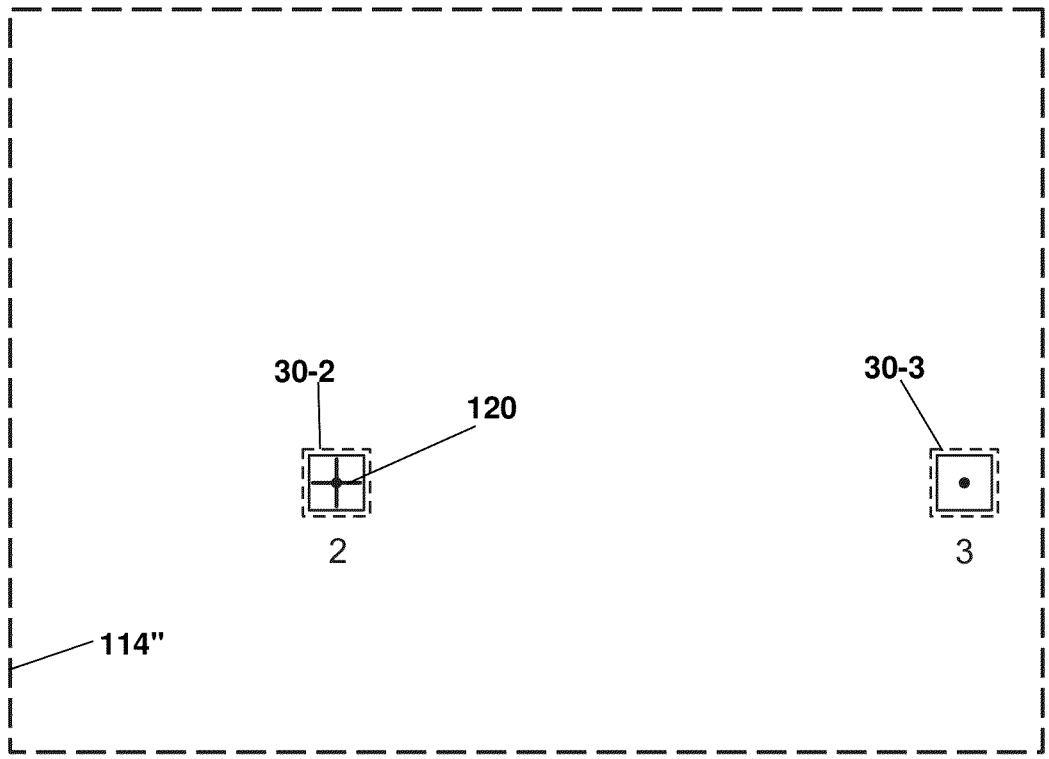

As seen in FIG. 2F, the last of the four markings 30-2 is outside of field of view 114'. However, controller 118 may have previously identified the existence of marking 30-2 (for example when scanning for marking 30-0 in FIG. 2B) of may anticipate the existence of such a marking to form a closed rectangular structure. As such, in FIG. 2G, controller 118 moves the marker 120 to align with marking 30-2, thus returning also moving the field of view to the left, resulting in a third field of view 114".

Following completion of the scanning process of FIGS. 2B to 2G, controller 118 has identified each of markings 30, and has aligned the marker 120 therewith accurately. The controller 118, and CNC machine 100, are now aware of the spatial relationship of working element 108 relative to workpiece 12, and are set to initiate work on the workpiece.

It is to be appreciated that in some embodiments, following scanning or decoding of the markings 30, the movement therebetween may be in accordance with a pre-defined, and previously stored, movement routine. In some embodiments, the movement routine may be defined in a calibration phase occurring prior to the scanning phase. An exemplary calibration phase is described hereinbelow with respect to FIGS. 7A and 7B. In other embodiments, the movement routing may be defined by the scanning or decoding operations, and then may be stored for use when cutting, or otherwise operating on, workpiece 12.

Figure 3:
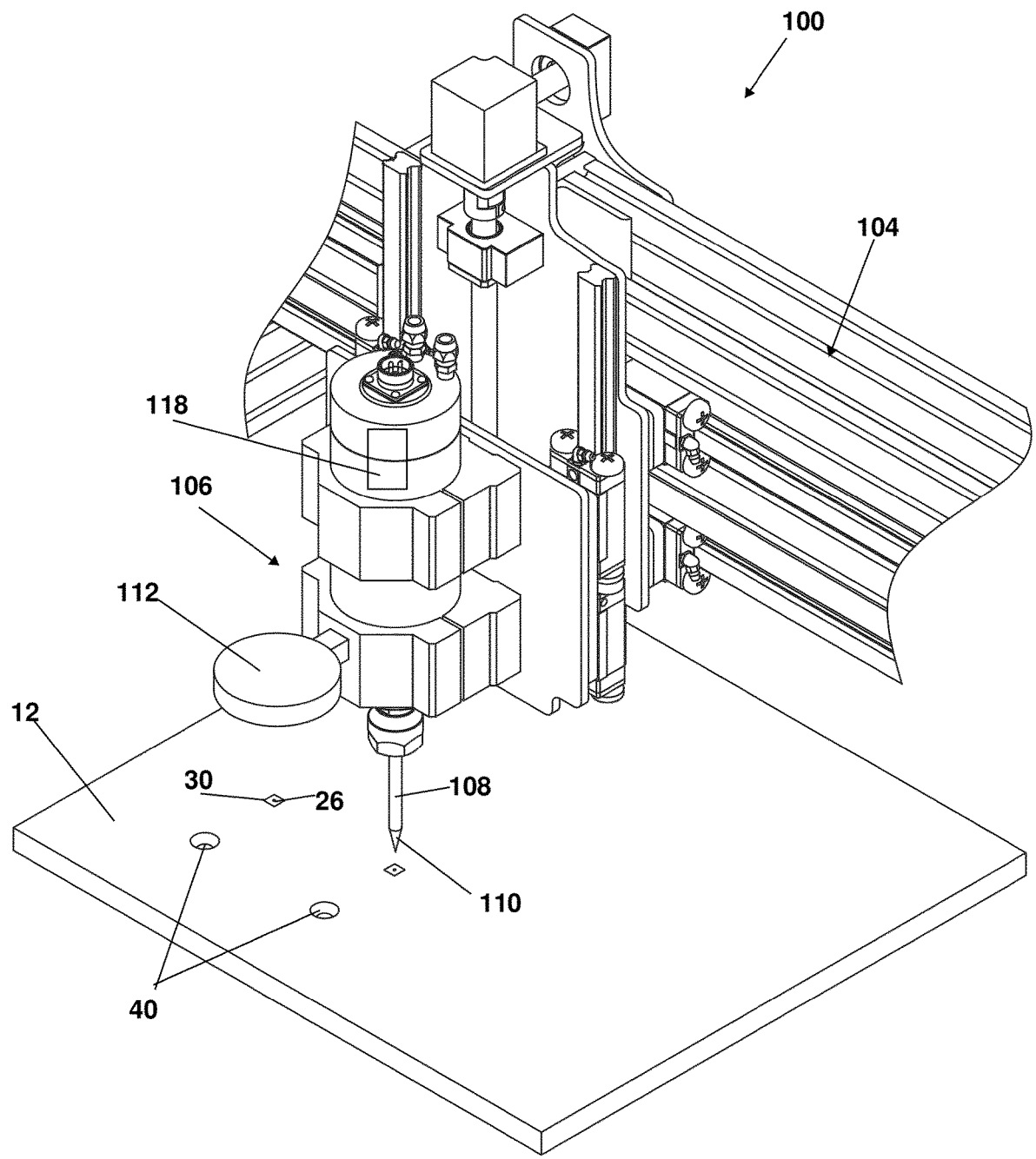
FIG. 3 shows a cutting step of a method for modifying a workpiece using a CNC machine according to an embodiment of the disclosed technology, the cutting being based on the markings of FIGS. 1A and 1B and the scanning of FIGS. 2A to 2G.

FIG. 3 shows a cutting step of a method for modifying a workpiece using a CNC machine according to an embodiment of the disclosed technology, the cutting being based on markings 30 of FIGS. 1A and 1B and the scanning of the markings in FIGS. 2A to 2G.

As seen in FIG. 3, following scanning of markings 30, controller 118 brings working element 108 to each of the markings in turn, to modify workpiece 12 at the location of each of the markings. In the illustrated embodiment, working element 108 is a cutting element, and controller 118 causes the working end 110 of cutting element 108 to cut or drill a hole 40 at each of markings 30. Typically, the starting position of the cutting element 108 is at point 26, within each of markings 30. As such, at least some of the markings on workpiece 12, namely markings 30, are associated with a predefined series of movements (e.g. drilling a hole and/or moving to the next marking) which begin at a position of a detected marking 30 on the surface of workpiece 12.

In some embodiments, the depth of the hole may be provided to controller 118 separately, such as a parameter provided in a code file, or may be a default depth. In some embodiments, the depth of the hole may be provided to the controller as visual input via device(s) 112, as explained hereinbelow with respect to FIGS. 6A to 6C.

Figure 4A:
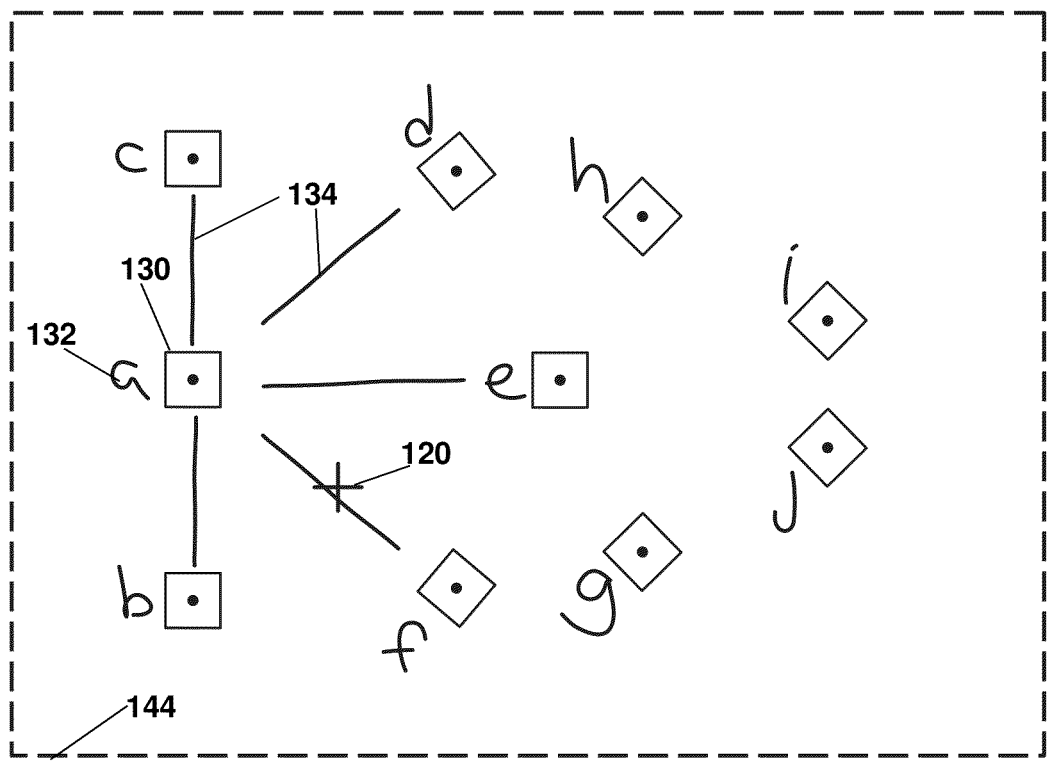
FIGS. 4A and 4B illustrate marking and scanning steps of a method for modifying a workpiece using a CNC machine according to another embodiment of the disclosed technology.
Figure 4B:
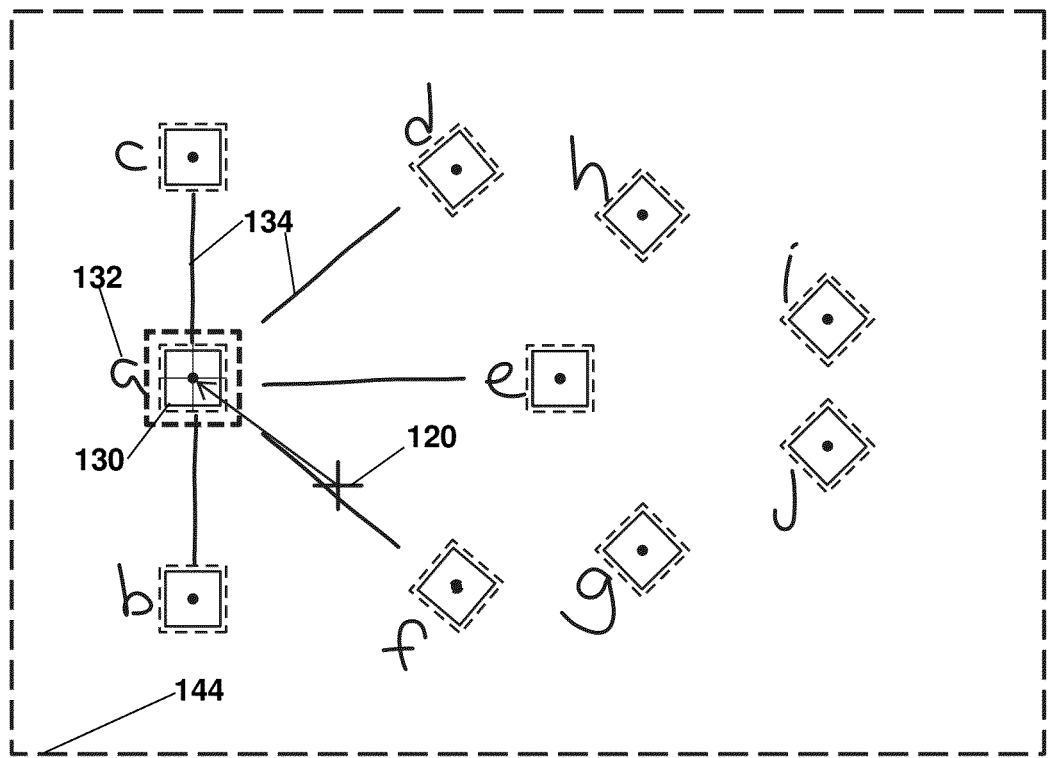

FIGS. 4A and 4B illustrate marking and scanning steps of a method for modifying a workpiece using a CNC machine, such as CNC machine 100 of FIG. 2A, according to another embodiment of the disclosed technology.

As seen in FIGS. 4A and 4B, in addition to placement of markings 130 on a workpiece, similar to marking 30 of FIGS. 1A and 1B, the user has also labeled the markings 130 with letters a, b, . . . . J, indicated by reference numeral 132. The user can use further added lines 134 extending between some of the markings, or some of the letters.

In the embodiment of FIGS. 4A and 4B, spatial recognition system 116 and/or controller 118 includes a character recognition functionality, such as a suitable software component, such that when scanning the input received from device(s) 112, controller 118 can identify the characters 132, and use the sequence of the characters 132 to determine the sequence of scanning of the markings 130 and/or of moving between the markings or working on each of the markings.

As seen, in FIG. 4A, marker 120 is placed in a random location in a field of view 144. In FIG. 4B, marker 120 is being moved toward marking 130 at location a, which is the first marking within the field of view.

Furthermore, controller is adapted to identify the placement of lines 134, and to use the placement of the lines as guidance for operating on the workpiece. For example, the instructions for how to treat a line may be provided in a separate instruction file or instruction code provided to controller 118, or may be provided to the controller using parameters set into variables, as explained in further detail hereinbelow with respect to FIGS. 6A to 6C.

Figure 5:
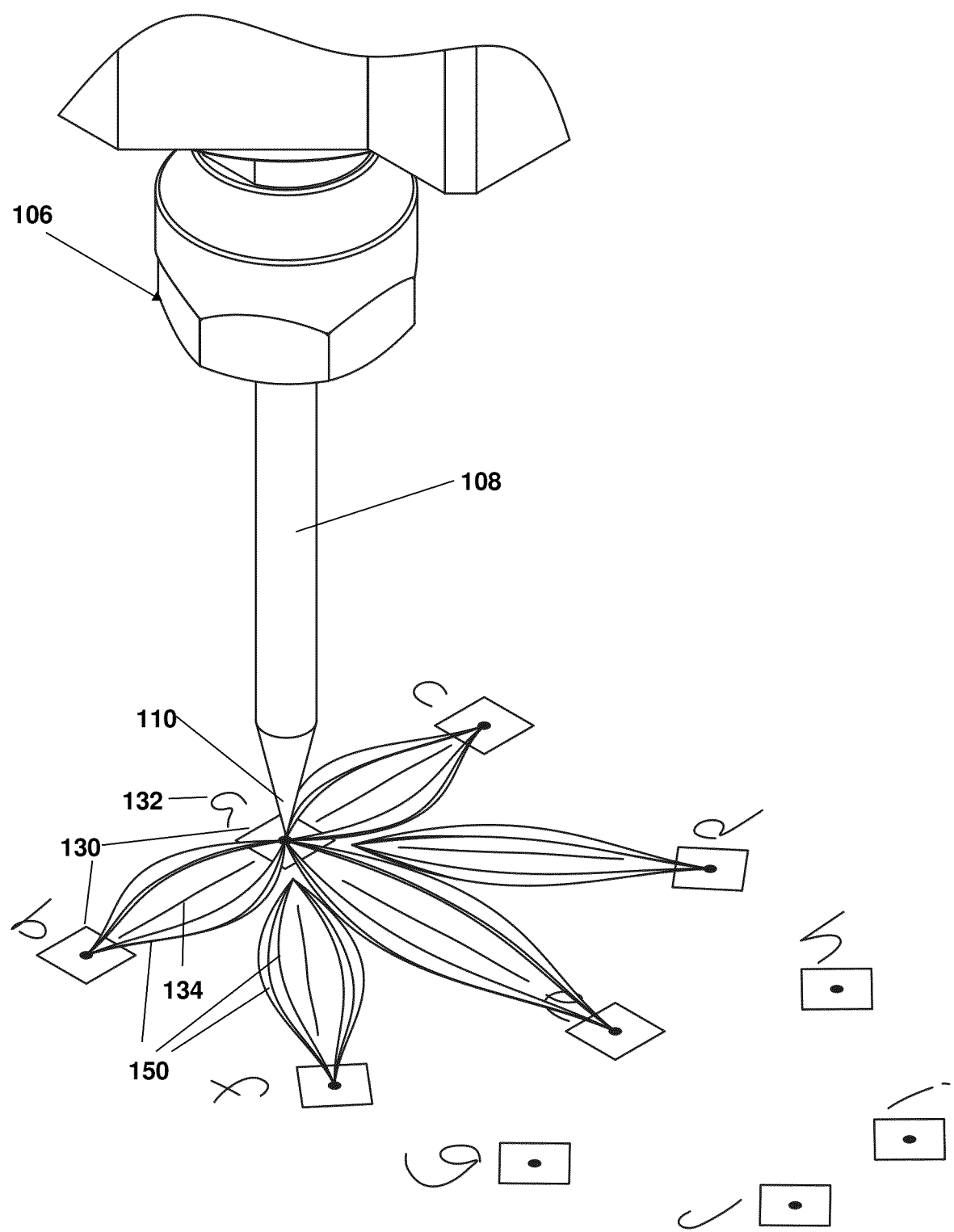
FIG. 5 shows an etching step of a method for modifying a workpiece 285 using a CNC machine according to another embodiment of the disclosed technology, the cutting being based on the marking and calibration of FIGS. 4A and 4B.

Turning to FIG. 5, it is seen that controller 118 has caused motion of the working head 106 of CNC machine 100, such that the working end 110 of cutting element 108 has etched multiple lines 150 in the workpiece 12. The lines 150 extend between markings 130 which have lines 134 therebetween, to form the appearance of leaves. The exact placement of the etched curves 150 is defined relative to lines 134 and relative to markings 130, and is in accordance with instructions provided to controller 118 via any suitable method, such as in instruction code, or using variables, as explained herein.

As seen from FIGS. 4A, 4B, and 5, inclusion of additional indicators on workpiece 12, in addition to markings 30 or 130, enables CNC machine 100 to perform complex operations, such as etching of a pattern, while keeping much of the transfer of information from the operator to the CNC machine via perceivable markings on the workpiece. As such, at least some of the markings on workpiece 12, namely lines 134 (or lines defined by two squares), are associated with a predefined series of movements which begin at a position of a detected marking 130 on the surface of workpiece 12.

In a similar manner, indicators on workpiece 12 may include letters to be etched over by CNC machine 100.

Figure 6A:
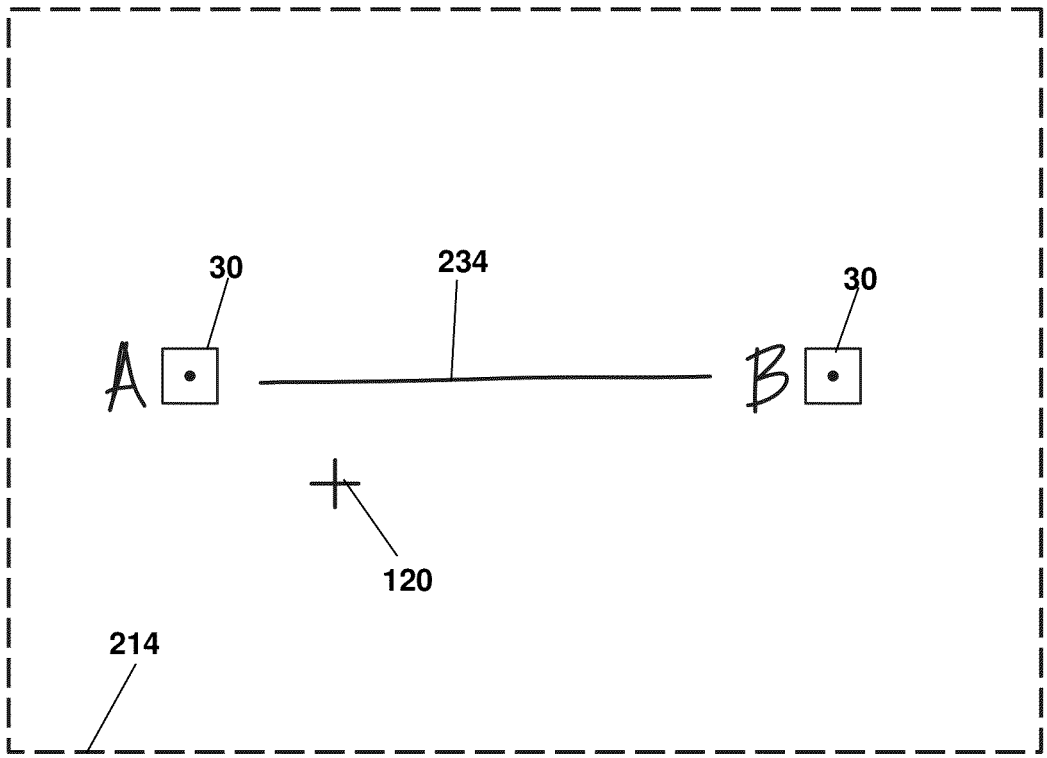
FIGS. 6A, 6B, and 6C illustrate marking and scanning steps of a method for modifying a workpiece using a CNC machine according to another embodiment of the disclosed technology, where the modification is formed between two reference points and/or using variables.
Figure 6B:
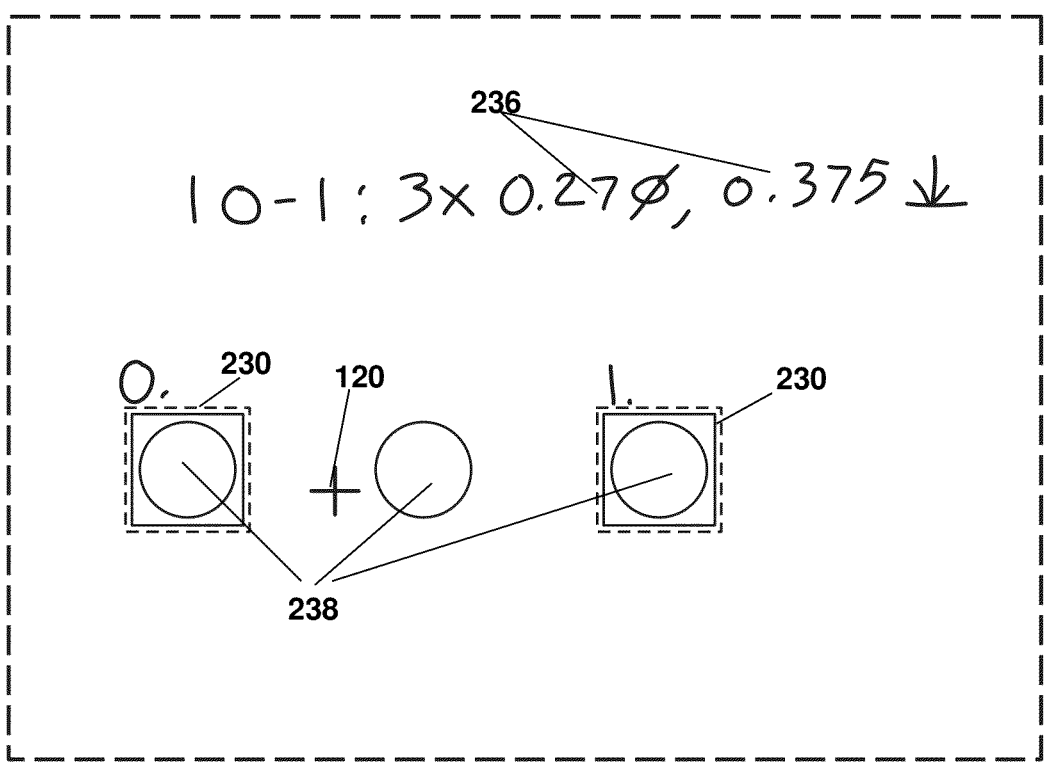
Figure 6C:
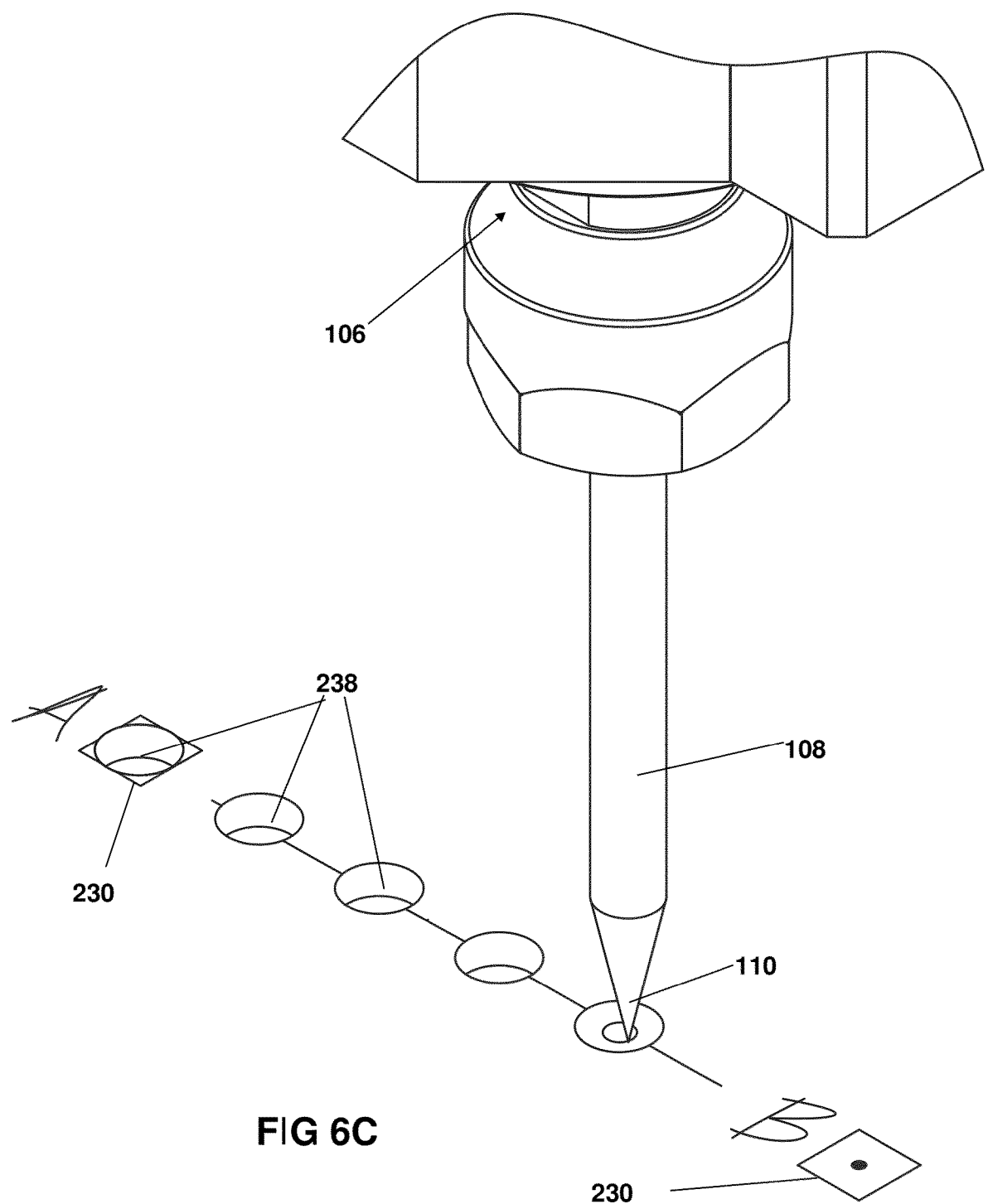

FIGS. 6A, 6B, and 6C illustrate marking and scanning steps of a method for modifying a workpiece using a CNC machine according to another embodiment of the disclosed technology, where the modification is formed between two reference points and/or using variables.

As seen in FIG. 6A, two markings 230, labeled with A and B, are provided on the surface of a workpiece, within a field of view 214 of the CNC machine. In some embodiments a line 234 may be drawn between the two markings. The two markings 230 define two reference points, which may be associated with a movement routine. The use of two reference points, enables the movement routine to be translated, rotated, and/or scaled, based on a position of the second marking relative to a position of the first marking. As a result, the working element 108 engages the workpiece at locations relative to the first and second markings, and not in absolute locations.

For example, if the two markings are close to each other, a smaller number of holes may be drilled between the two markings, than if the two markings are further from each other. Alternately, if three holes are to be drilled at equal distances between the two markings, the distance between each two holes will be greater when the distance between the reference points is greater, and will be smaller when the distance between the reference points is smaller.

Turning to FIG. 6B, it is seen that two reference markings, as described with respect to FIG. 6A, can be used in combination with variables to define a movement routine for the working element 108 of the CNC machine. For example, in FIG. 6B, two markings 230 are labeled 0 and 1. Values 236, associated with various variables related to cutting of workpiece 12, are marked onto the workpiece. In the illustrated embodiment, the variables define that, between points 0 and 1, the CNC machine should cut three holes having a diameter of 0.27 in and a depth of 0.375 in. As seen, the result is three bores 238, two of which are on points 0 and 1, and the last of which is spaced equally between the two.

Further, a user can write code on the material such as by way of a programming language known in the art and/or call a class and/or function pre-set within the CNC machine (e.g. "class Bore"). For example, "Bore(Rect(A,B), diam=0.25, d=0.5)" might make a 0.25" diameter, 0.5" deep hole at the corners of the rectangle defined by the two diagonal points A and B.

In a similar manner, any number of parameters, or any information, may be provided, in writing, on the surface of the workpiece, to be scanned by the CNC machine. For example, the markings may include symbols, such as letters, digits, or marks, to be etched by the CNC machine, a specification of a font and/or text size to be used for etching text, a depth of etching or drilling, and the like. As another example, the markings or variable provided on the surface of the workpiece may define parameters of a tool to be used, such as a type of tool, or properties of the tool, e.g. its diameter or its height. QR codes may be associated with pre-defined such parameters and be placed on the tool's storage container or nearby and used to indicate via visual input device to a CNC machine which tool is in use on the CNC machine.

FIG. 6C shows the markings 230 labeled as reference points A and B, having five bores drilled therebetween. The variation in the number of bores may be defined by a marking or by indicia, which may be provided on the surface of workpiece 12, in a similar manner to that shown in FIG. 6B. For example, the marking on workpiece 12 may indicate a fixed distance between every two bores along the line A-B, such that the number of bores depends on the distance between the two reference points. As another example, the marking on workpiece 12 may provide a function, defining a variation on the sequence of movements that CNC machine 100 is programmed to do when identifying two reference points. For example, the function may be a trigonometric modifying function, including the drawing of sin or tan curves, drawing a similar triangle, changing a size, angle, or the like of a shape compared to a saved parametric shape. As another example, the marking may provide a specific number of bores to be made between reference points A and B, such that the distance between each two bores is dependent on the distance between reference points A and B.

Figure 7A:
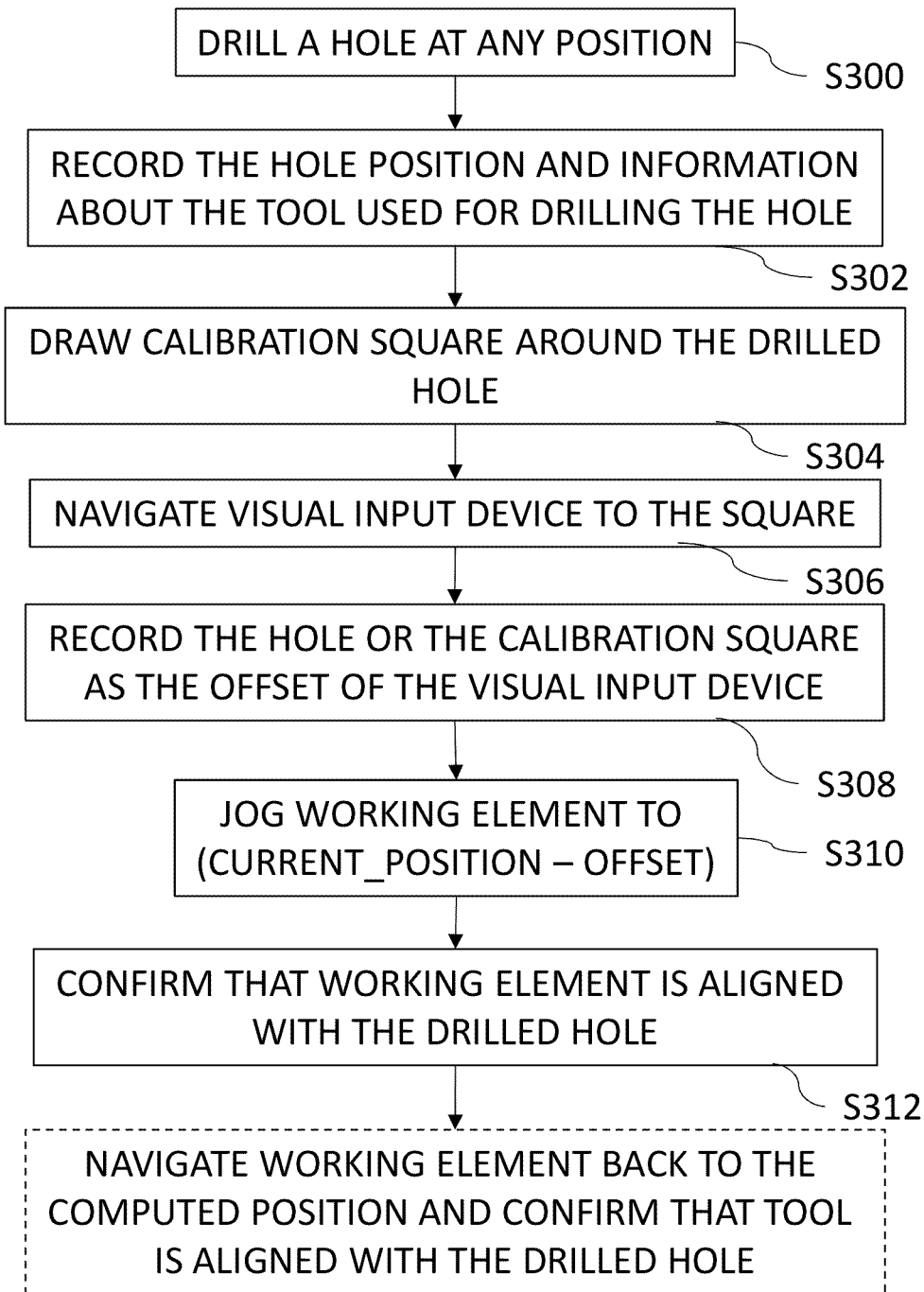
FIGS. 7A and 7B are flowcharts of a method for initial calibration of a CNC system according to the disclosed technology.

FIG. 7A is a series of flowcharts of a method for initial calibration of a CNC system according to the disclosed technology which determines the spatial offset of the visual input device from the central axis of the working element.

As seen in FIG. 7A, initially a hole is drilled at any position on a calibration workpiece at step S300 provided that the position is within the center of a field of view of visual input device (112, FIG. 2A), such as a camera. The hole position and tool number used for drilling the hole are recorded, for example to a preferences file, at step S302. For example, the record may indicate that a ¼" end mill tool Tl was used to drill a ¼" diameter hole having a depth of ½" at position X=10.0" and Y=10.0". Typically a Z-axis position of the visual input device is set to a minimal value, such as ½", which brings the camera close to the calibration workpiece.

At step S304, a calibration square is drawn around the drilled hole, such that the drilled hole is at the center of the calibration square. In order to ensure that the hole is indeed centered in the square, supporting tools may be used, such as a jig allowing centering of a square stencil on the hole.

At step S306, the controller (118, FIG. 2A) navigates the visual input device to the square, and the position of the calibration square, and therefore of the hole drilled at step S300, is recorded as a new offset for the visual input device at step S308. Continuing the example brought hereinabove with respect to step S302, at step S306 the visual input device may be navigated to the square, resulting in a position reading of X=15.0" and Y=15.0". Thus, the new offset recorded at step S308 would be (5.0", 5.0") ($X_{offset}=X_{camera}-X_{drilled}=15.0-10.0=5.0$, same for $Y_{offset}$).

At step S310, working element (108, FIG. 2A) of the CNC machine is navigated to (current_position−new_offset), and at step S312 the user confirms that the working element is aligned with the hole drilled at step S300.

In some embodiments, the method of calibration may further include an optional step S314, in which the controller navigates the working element back to the computed position, and the user confirms that the tool is aligned with the previously drilled hole.

Figure 7B:
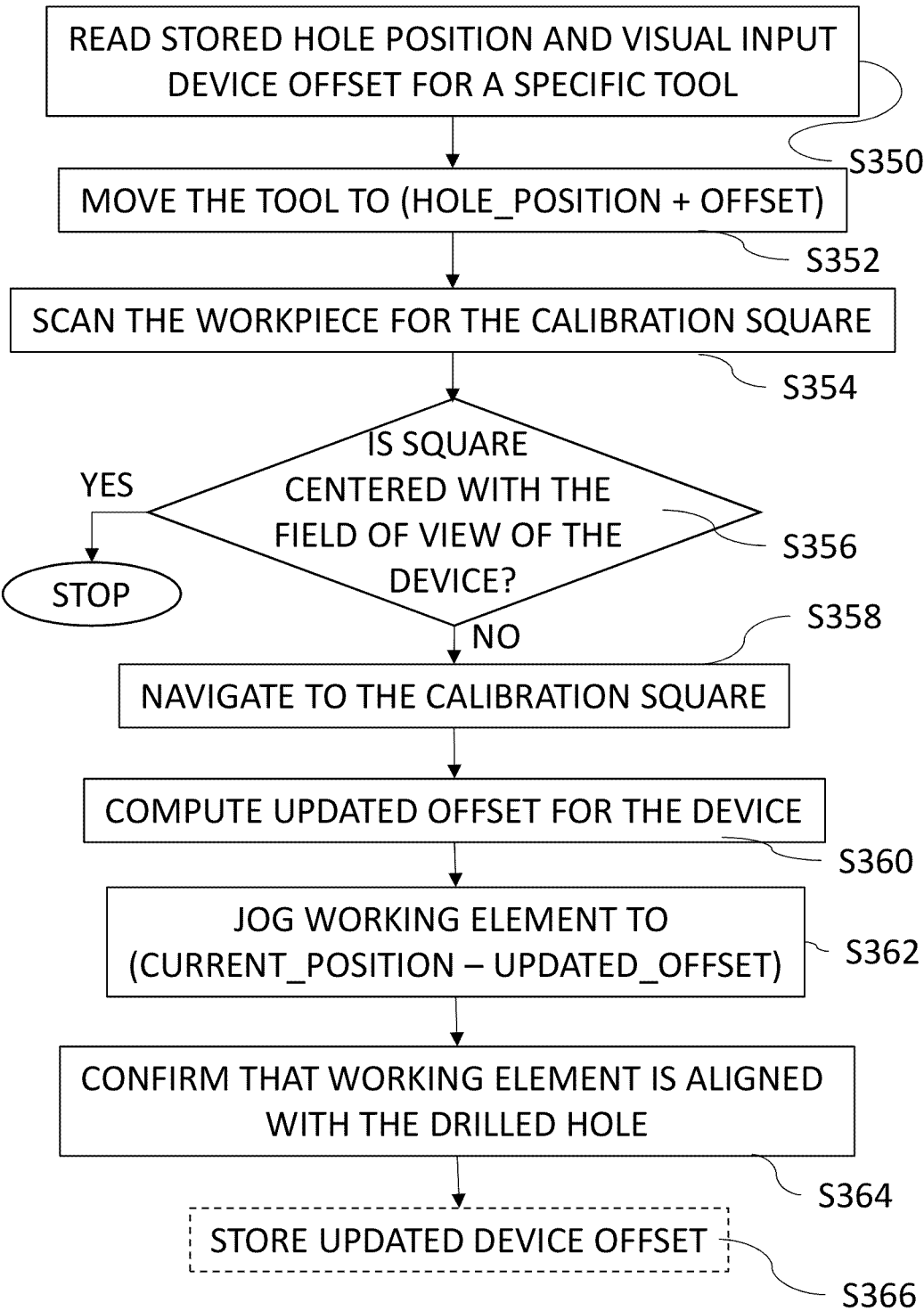

FIG. 7B is a flowchart of a method for confirmation of calibration, or recalibration, of a CNC system according to the disclosed technology.

At an initial step S350, a stored hole position, and a visual input device offset for a specific tool, are read from a preferences file, where they were previously stored. At step S352, the controller moves the tool to a location at (hole_position+visual_input_device_offset), and scans the workpiece for the calibration square at step S354.

At step S356, the operator, or the controller, evaluates whether the square is precisely centered within the field of view of the visual input device. If the square is precisely centered, the recalibration process is complete. Otherwise, if the square is not precisely centered, at step S358 the controller causes the visual input device to navigate to the square, and computes a new device offset by subtracting the newly acquired calibration square position from the saved hole position, at step S360. At step S362, the working element is jogged to (current_position−updated_offset), and at step S364 the user confirms that the working element is aligned with the hole drilled at step S300. The user may then be prompted to update the stored camera offset, at step S366.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. A method for automated precision control of a computer numerical control (CNC) machine to a workpiece comprising:
    receiving via at least one visual input device at least one detectable marking on a workpiece;
    detecting at least a position and a shape of at least one detectable printed marking;
    determining at least one stored and pre-defined movement routine of a cutting element attached to said CNC machine relative to said workpiece based on said detecting of said at least one detectable printed marking;
    determining, based on said at least one detectable marking, a sequence of said at least one determined routine, each said routine comprising one starting point and one ending point;
    determining, based on said at least one detectable marking, a position of said starting point of each said routine relative to said at least one detectable marking for each of said at least one determined routine;
    determining, using said at least one visual input device and/or another visual input device, a current position of a working end of said cutting element relative to said at least one marking; and
    performing said pre-defined movement routine comprising cutting into said workpiece with said cutting element.

2. The method of claim 1, wherein said one starting point and said one ending point of at least one of each said routine are at a same position.

3. The method of claim 1, wherein each said routine comprises at least one middle point which is unaligned with said at least one starting point and one ending point.

4. The method of claim 1, wherein said at least one visual input device and a holder for said cutting element are fixedly mounted to a movable housing at a proximity such that a central axis of a working end of said cutting element remains within a field of view of said at least one visual input device, and move together, relative to a position of said workpiece, wherein said movable housing is mobilized by a mobilizing assembly.

5. The method of claim 4, wherein said cutting element holder is adapted to removably hold said cutting element and a mount for said workpiece is adapted to removably hold said workpiece.

6. The method of claim 4, wherein said at least one visual input device comprises a plurality of visual input devices which are used to determine at least a two-dimensional location in a three-dimensional space of said workpiece.

7. The method of claim 1, wherein said at least one marking is determined, in said step of decoding, to be any one of a polygon, square, circle, an x shape or a cross shape, and wherein the center of said at least one marking is a calibration point for determining the spatial offset of said at least one visual input device from the central axis of said working element along a horizontal plane.

8. The method of claim 1, wherein in said step of detecting, detecting a marking of two lines is insufficient to cause said step of performing to be carried out until said two lines are inscribed within a larger proximate shape.

9. The method of claim 1, wherein said pre-defined movement routine is parameterized by one or more variables; and
    said at least one marking comprises a marking of at least one letter and/or number representative of a constant value used in place of each of said one or more variables when performing said pre-defined movement routine.

10. The method of claim 9, wherein said pre-defined parameterized movement routine is modified by at least one of a rotation, translation, or scaling, based on said at least one marking.

11. The method of claim 1, wherein said at least one marking comprises a first marking and a second marking;
    said first marking corresponds to a first reference point of said pre-defined movement routine; and
    said second marking corresponds to a second reference point on said workpiece cut during said pre-defined movement routine.

12. The method of claim 11, wherein said pre-defined movement routine is at least one of translated, rotated and scaled based on a position of said second marking compared to a position of said first marking.

13. The method of claim 1, wherein said at least one visual input device and a holder for said cutting element are fixedly mounted to a movable housing at a distance to each other of substantially one inch, and move together, relative to a position of said workpiece, wherein said movable housing is mobilized by a mobilizing assembly.

14. A method for automated precision control of a computer numerical control (CNC) machine to a workpiece comprising:
    receiving via at least one visual input device at least one detectable hand-written marking on a workpiece;
    detecting at least a position of at least one detectable hand-written marking;
    determining at least one stored and pre-defined movement routine of a cutting element attached to said CNC machine relative to said workpiece based on decoded shape of said at least one hand-written marking;
    determining, based on said at least one detectable hand-written marking, a sequence of said at least one determined routine, each said routine comprising one starting point and one ending point;
    determining, based on said at least one detectable hand-written marking, a position of said starting point of each said routine relative to said at least one decoded marking for each of said at least one determined routine;
    determining, using said at least one visual input device and/or another visual input device, a current position of a working end of said cutting element relative to said at least one hand-written marking; and
    performing said pre-defined movement routine comprising cutting into said workpiece with said cutting element; and
    wherein, said cutting element comprises any one of a drill press, a milling machine, a lathe, a CNC mill, a router, a plasma cutter, a punch or a laser.

15. A method for automated precision control of a computer numerical control (CNC) machine to a workpiece comprising:
    receiving via at least one visual input device at least one detectable marking on a workpiece;
    detecting at least a position and a shape of at least one detectable marking, said shape found within the Geometric Dimensioning and Tolerancing language as defined in ASME Y14.5;
    determining at least one stored and pre-defined movement routine of a cutting element attached to said CNC machine relative to said workpiece based on said detected shape of said at least one marking;
    determining, based on said at least one detectable marking, a sequence of said at least one determined routine, each said routine comprising one starting point and one ending point;
    determining, based on said at least one detectable marking, a position of said starting point of each said routine relative to said at least one detectable marking for each of said at least one determined routine;
    determining, using said at least one visual input device and/or another visual input device, a current position of a working end of said cutting element relative to said at least one marking; and
    performing said pre-defined movement routine comprising cutting into said workpiece with said cutting element.

* * * * *